United States Patent [19]

Schaer

[11] 3,909,150
[45] Sept. 30, 1975

[54] APPARATUS FOR CONTROLLING THE FORWARD AND RETURN MOVEMENT OF A DRILLING SPINDLE

[75] Inventor: Hans Schaer, Norwalk, Conn.

[73] Assignee: Fabrique de Machinen André Bechler SA, Bern, Switzerland

[22] Filed: June 10, 1974

[21] Appl. No.: 478,152

[30] Foreign Application Priority Data
June 14, 1973 Switzerland.......................... 8640/73

[52] U.S. Cl................................. 408/17; 408/130
[51] Int. Cl.² ................ B23B 27/22; B23B 47/22
[58] Field of Search ...... 408/17, 130, 129; 90/11 R, 90/14; 91/277; 173/115

[56] References Cited
UNITED STATES PATENTS

| 2,631,480 | 3/1953 | Romine et al. .................... 408/17 X |
| 2,727,413 | 12/1955 | Fausek et al. .......................... 408/17 |
| 3,091,137 | 5/1963 | Aronson ......................... 408/130 X |
| 3,704,957 | 12/1972 | Petroff .............................. 408/129 |
| 3,837,121 | 9/1974 | Schirmer........................... 408/17 X |

FOREIGN PATENTS OR APPLICATIONS
250,957   7/1948   Switzerland........................ 408/129

Primary Examiner—Robert L. Spruill
Assistant Examiner—W. R. Briggs
Attorney, Agent, or Firm—Werner W. Kleeman

[57] ABSTRACT

An apparatus for controlling the forward and return movements of a drilling spindle operated by a primary actuation element which determines the forward speed and the total forward stroke of the drilling spindle. A plunger assembly operatively connects the primary actuation element with the drilling spindle. Reversing valve means act via the plunger assembly upon the drilling spindle for initiating its rapid forward and reverse movements. Means are provided for triggering forward movement of the drilling spindle during a portion of the time that the drilling spindle carries out its rapid return movement, said means including adjustable means for selectively determining the point in time during rapid return movement of the drilling spindle that its rapid forward movement should be initiated.

2 Claims, 5 Drawing Figures

APPARATUS FOR CONTROLLING THE FORWARD AND RETURN MOVEMENT OF A DRILLING SPINDLE

BACKGROUND OF THE INVENTION

The present invention relates to a new and improved construction of apparatus for controlling the forward and return movements of a drilling spindle wherein a primary actuation element, determining the advancing or forward speed during the effective drilling work and total forward stroke, is operatively connected through the agency of a plunger unit with the drilling spindle during the entire working cycle.

If such apparatus is mounted for instance at an automatically operating machine, for instance at part of a drill assembly at an automatic lathe, then the primary actuation element can be constituted by, for instance, a control cam. In such and similar situations there is oftentimes the need, during drilling of a deep hole, to intermittently carry out a rapid return and forward movement of the drilling spindle together with the drill bit for the purpose of ejecting the chips. Hence, there is also present the need of being able to adjust ahead of time the path of displacement which is traversed during such rapid return and forward movements.

OBJECT OF THE INVENTION

Hence, it is a primary object of the present invention to render possible the above adjustment of the path of travel during the rapid return and forward movements by means of apparatus designed according to the invention wherein such rapid forward and return movements are brought about pneumatically, however should be initiated by any suitable transmitter delivering a brief electrical current pulse.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 3:
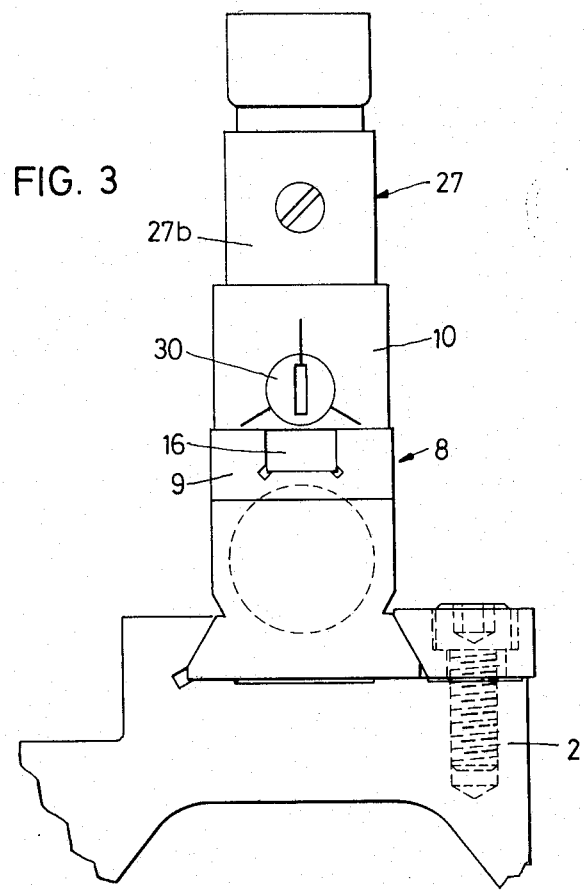
FIG. 3 is an end view of the arrangement depicted in FIG. 2, looking in the direction of the arrow III.

Describing now the drawings, it is to be understood that the illustrated exemplary apparatus is employed for controlling the forward and return movement of a machine tool component, especially a drilling or boring spindle constituting part of an auxiliary drilling apparatus mounted at an automatic lathe. Reference numeral 1 designates, for instance, part of a conventional control shaft of an automatic lathe, and reference numeral 2 (FIG. 3) a stationary support or carrier portion. Reference numeral 3 designates the rearmost part of the drilling or boring spindle which is equipped with a capped nut 4 and an entrainment disk 5. A purely schematically depicted cam drum 6 which is fixedly seated upon the control shaft 1 functions as the primary actuation element which, through the agency of a transmission lever 7 and a plunger assembly or unit, collectively designated by reference numeral 8, determines the advancing or forward speed of the drilling spindle 3 during each effective drilling operation and the total advancing stroke of such drilling spindle during the entire working cycle of the auxiliary drilling or boring apparatus just as if there were provided a rigid plunger instead of the now to be described plunger assembly.

Figure 2:
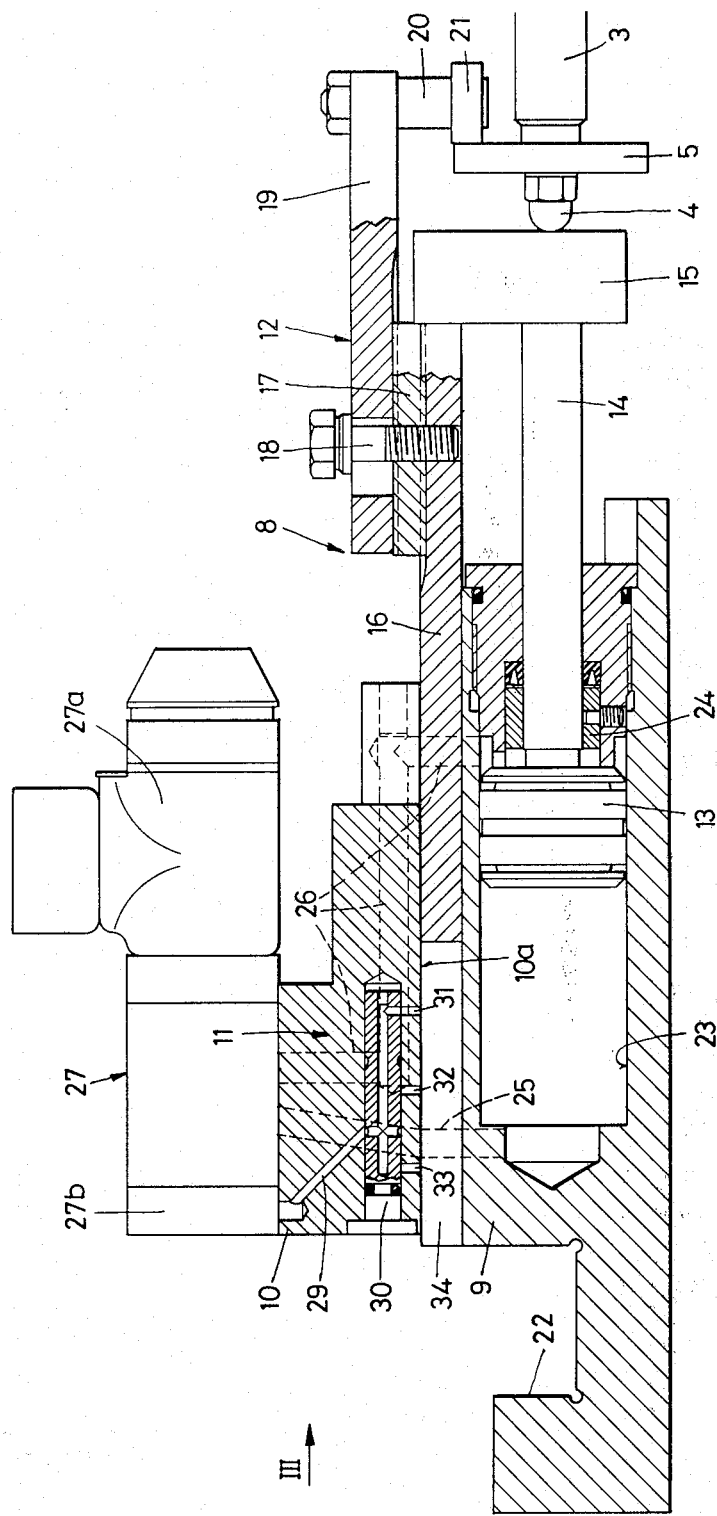
FIG. 2 is an enlarged longitudinal sectional view of the apparatus of FIG. 1.

The plunger unit or assembly 8 embodies an element or slide 11 composed of the components or parts 9 and 10 connected with one another by not particularly illustrated screws or equivalent structure and displaceably guided at the carrier or support portion 2 in the lengthwise direction of the drilling spindle 3 and further incorporates another element 12 primarily consisting of a double-acting piston 13 equipped with the piston rod 14, a connection yoke or member 15, a shut-off slide member 16, an intermediate portion 17, a screw 18, an arm or overhang beam 19, a bearing bolt 20 and an entrainment ring 21, as best seen by referring to FIG. 2.

Figure 1:
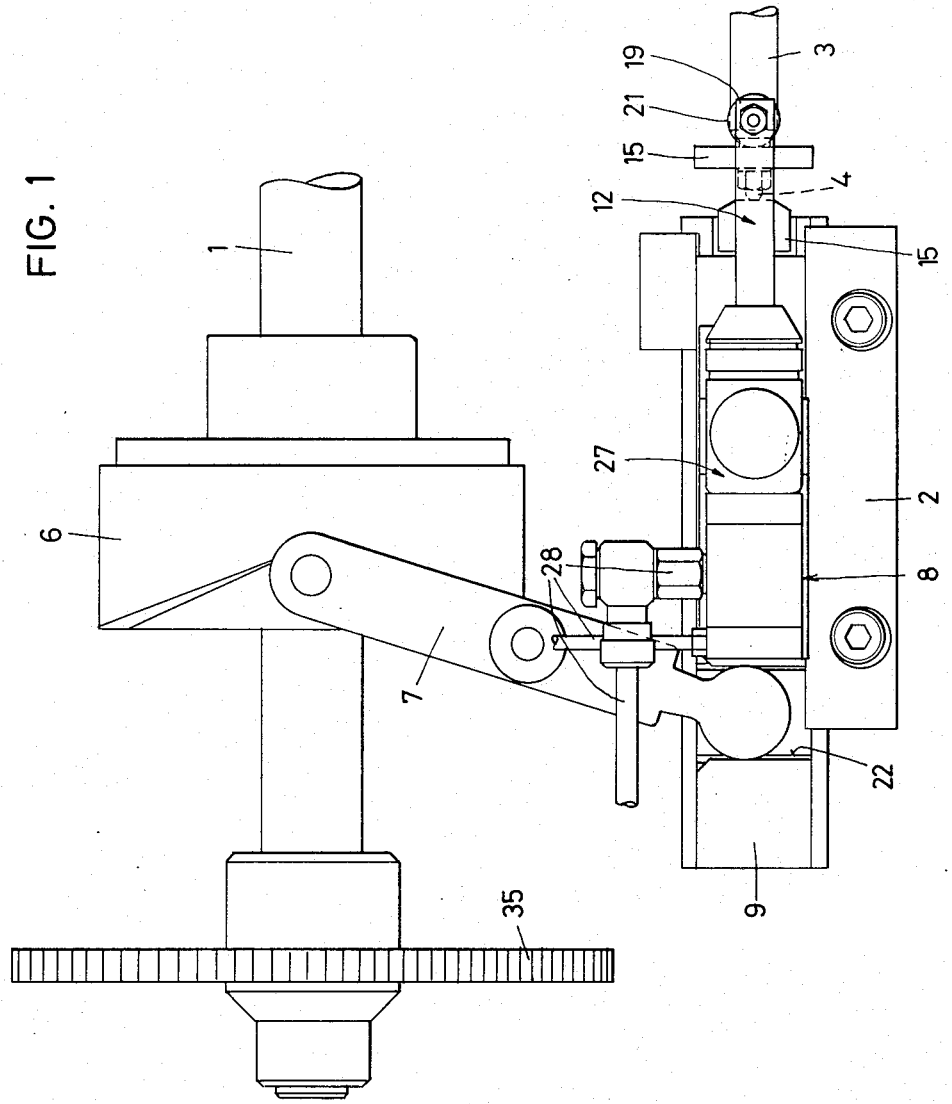
FIG. 1 is a plan view of an exemplary embodiment of apparatus controlling the forward and return movement of a drilling spindle.

The part 9 of the one slide 11 has a transversely extending groove 22 within which there operates practically free of play an end portion of the transmission lever 7. This part 9 additionally possesses a substantially cylindrical compartment or chamber 23 within which operates the reciprocable piston 13, the piston rod 14 piercingly extending through a multi-part packing sleeve or bushing 24 which is of conventional design. The opposite ends of the cylinder compartment or chamber 23 are flow connected via channels 25 and 26 provided at the parts 9 and 10 with throughflow openings of a reversing or switching valve 27. This reversing valve 27 is a conventional commercially available slide valve, the inlet of which is connected via conduit portions 28 (FIG. 1) with a suitable source of compressed air. Furthermore, the valve spool or slider (not shown) of the reversing valve 27 is electromagnetically operated, in the sense of freeing or opening the flow paths, in order to bring about the pneumatic rapid return movement of the other element 12 of the plunger unit or assembly 8 together with the drilling spindle 3 with respect to the one element 11 of such unit i.e. the displacement of component 12 of the plunger unit 8 towards the left of FIG. 2 with regard to component 11 by admitting compressed air through the channel 26 and venting the channel 25. It is to be understood that the solenoid, in the exemplary embodiment under discussion, is accommodated at the right-hand located part 27a, FIG. 2, of the reversing valve 27. On the other hand, actuation of the slider or valve spool of the reversing valve 27 in the opposite direction, in other words in the sense of the rapid forward movement of the "other" element 12 and the drilling spindle 3 occurs by a servo-motor owing to non-venting at the end part 27b of the valve located at the left-hand side of the showing of FIG. 2, as will be now explained.

Figure 4:
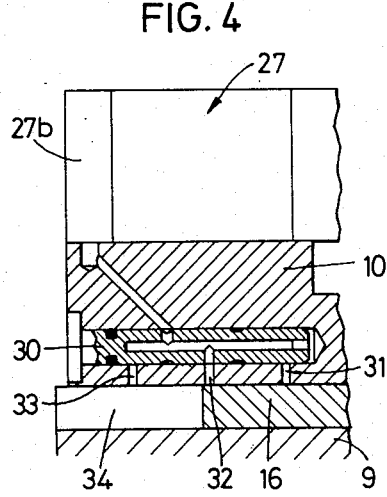
FIGS. 4 and 5 respectively show two sectional details of the arrangement of FIG. 2, however portraying an adjustment shut-off element in two other shut-off adjustment positions.
Figure 5:
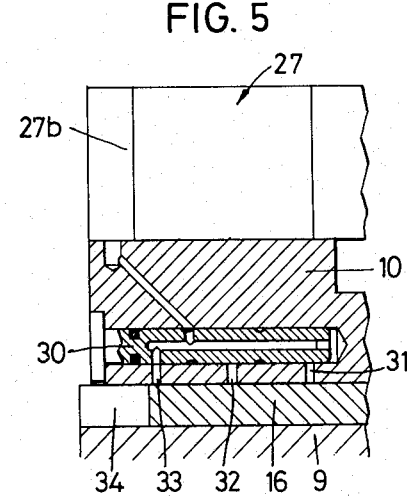

The vent path provided at the component or part 10 for such end portion 27b is composed of a channel 29 leading away from the end portion or component 27b and an adjustment shut-off element 30 which can be manually actuated. The adjustable element 30, depending upon its adjusted position (compare FIGS. 2, 4 and 5), flow communicates the channel 29 with the one or the other of a number of bores or ports 31, 32, 33 which alternately form the remaining portion of the vent path. It should be appreciated that, by way of example in the embodiment under discussion, there have been shown the provision of three such bores or ports 31, 32 and 33. These bores, viewed in the direction of displacement of the plunger unit 8, and which are located in spaced relationship behind one another in the smooth wall surface 10a of the part 10, open into an opening 34 of the one element 11 of the plunger unit, namely a groove or channel 34 at the element portion 9. In this channel or opening 34 there operates the shut-off slide 16 (which forms a part of the other plunger assembly element 12) in the sense that, during the return movement of such shut-off slide 16 together with the drilling spindle 3 connected therewith by means of the components 4 and 5, it initially only blocks or covers the bore 31, then both the bores 31, 32 and finally all of the bores 31, 32 and 33. If, as shown in FIG. 2, the first of such bores, namely bore 31, is connected with the channel 29 by means of the adjustment shut-off element 30, then already after moving through a short return path of, for instance, 13 mm, this bore 31 is closed by the shut-off slide 16, in other words the vent path of the reversing valve 27 is blocked. However, if the adjustment shut-off element 30 assumes the position shown in FIG. 4, then the vent path is first blocked when the shut-off slide 16, during the course of its return movement, closes the bore 32, in other words, when the return path amounts to for instance 26 mm. In the event that the shut-off element 30 assumes the position shown in FIG. 5, then shutting-off of the vent path occurs when the shut-off slide 16 closes the bore 33, in other words when the return path amounts to for instance 39 mm.

As already discussed heretofore, during each such shutting-off of the vent path there is produced a pressure increase at the reversing valve component or part 27b. The reversing valve 27 automatically responds thereto in the sense of carrying out a valve reversing or switching operation, so that the compressed air flowing from the compressed air source then flows through the channel 25 into the cylinder compartment 23 and impinges the piston 13 at its left-hand face (FIG. 2), whereas the piston compartment located at the other side or face of the piston is vented via the channel 26 through the reversing valve. The piston 13 and all parts connected therewith of the other element 12 of the plunger unit 8 together with the drilling spindle 3 are thus rapidly moved towards the right — rapid advancing movement — until the piston 13 impinges against the packing bushing 24, and thereafter held in such relative position of the parts with regard to one another during the time that the entire plunger unit or assembly 8 together with the drilling spindle 3 is further advanced, stopped and retracted by the primary actuation element, namely, in this case the cam drum 6.

The electrical control pulses for the electromagnetic actuation of the reversing valve 27 for reversing operation to the rapid return movement of the plunger element 12 and the drilling spindle 3 may be supplied by one or a number of conventional electrical pulse transmitters. A first such type pulse transmitter can be, for instance, constituted by a combination of a shorttime relay with a switch which can be actuated by blocks or equivalent structure mounted at random locations of the periphery of a wheel 35 fixedly seated upon the control shaft 1. Another type of pulse transmitter, apart from containing for instance a shorttime relay, can possess a switch which responds to a function of the drilling apparatus (for instance attaining a predetermined forward terminal position of the drilling spindle) or the automatic lathe. In this regard there are available the most different possibilities, so that the apparatus can be easily accommodated to the momentary requirements.

The control apparatus of the invention is particularly useful as a component of an auxiliary drilling apparatus mounted on a so-called Swiss-type automatic lathe. In this lathe the turning chisels move only transversely, while the axial feed is performed by the bar stock together with the correspondingly moving headstock. A drilling spindle would have to perform only the differential motion if there were not the necessity for ejecting the chips. In known constructions the rapid return and forward movements were controlled by the cam. It is easy to understand that the flanks of corresponding cam depressions must not be too steep.

Thus there were strict limitations as to the depth of a hole that could be drilled and/or as to the number of chip ejections. Even so, the drilling operation extended over a major portion of a complete revolution of the control shaft. With the provision of the above-described control apparatus, such limitations are done away with. The control cam 6 need merely be profiled so that during each chip ejection, the part 9 is moved back by an amount slightly greater than the advance increment of the bar stock, so that the drill bit will not abut on the bottom of the bore at the end of its rapid advancing movement.

While there is shown and described present preferred embodiments of the invention, it is to be distinctly understood that the invention is not limited thereto, but may be otherwise variously embodied and practiced within the scope of the following claims.

Accordingly, what is claimed is:

1. An apparatus for controlling the forward and return movements of a drilling spindle wherein a primary actuation element, which determines the forward speed of the drilling spindle during the effective drilling operation and the total forward stroke, is operatively connected by means of a plunger assembly with the drilling spindle during the entire working cycle, the improvement comprising:

the plunger assembly possessing two elements which are displaceable relative to one another in the lengthwise direction of the drilling spindle, one of said two elements possessing a substantially cylindrical compartment in which operates a doubleacting piston constituting part of the other element, both ends of the cylinder compartment being connected via channels and a reversing valve means with a source of compressed air;

said reversing valve means comprising a slide valve having a housing secured to said one element, said slide valve including a valve spool which can be electromagnetically actuated in order to open a flow path for bringing about pneumatic return movement of said other element relative to said one element and the actuation of which is the forward direction occurs by a counterpressure owing to non-venting of said reversing valve means;

a manually adjustable adjustment shut-off element inserted at the one element at a vent path of the reversing valve means, said shut-off element including adjustable means which depending upon its adjusted position alternately communicates a channel forming a first portion of the vent path with one or the other of a number of bores forming a remaining portion of the vent path, said bores in the direction of displacement of both elements of the plunger assembly opening at a spacing behind one another into a smooth wall surface of a channel means extending at the one element in the lengthwise direction thereof, a shut-off slide fixedly connected with the other element operable in said channel means, said shut-off slide during the return movement of the other element relative to the one element initially closes one, then two, and finally all of said bores, so that during the course of a pneumatic rapid return movement of the other element together with the drilling spindle out of the bore hole being machined for the purpose of ejecting the drilling chips and initiated by electro-magnetic actuation of the reversing valve means there is again brought about a rapid forward movement of such other element together with the drilling spindle as soon as the shut-off slide closes that bore which is connected through the adjustment shut-off element with a part of said reversing valve means responsive to the counterpressure, whereby such rapid forward movement continues until the double-acting piston impinges against an end of the cylindrical compartment.

2. An apparatus for controlling the forward and return movements of a drilling spindle comprising, in combination: a primary actuation element for controlling the forward speed of the drilling spindle during the actual drilling operation and the total forward stroke of such drilling spindle during such actual drilling operation, plunger means for operatively connecting the primary actuation element with said drilling spindle, said plunger means incorporating at least two elements relatively displaceable with respect to one another, one of said two elements comprising a substantially cylindrical compartment, the other of said two elements comprising a double-acting piston reciprocal in said compartment, pneumatically operable reversing valve means for the rapid forward and return movements of said drilling spindle, channel means for flow communicating opposite ends of said compartment with said reversing valve means, said reversing valve means including means defining a vent path, a manually adjustable shut-off element provided for said vent path of the reversing valve means, said means defining said vent path including a channel and a number of bores, said shut-off element alternately communicating said channel with a given one of said number of bores as a function of the adjusted position of said shut-off element, a shut-off slide operatively connected with the other element of said plunger assembly, said shut-off slide during rapid return movement of said other element relative to said one element successively closing each of said bores, so that during the course of the rapid return movement of the other element together with the drilling spindle out of the bore hole being machined there is brought about a rapid forward movement of such other element together with the drilling spindle as soon as said shut-off slide closes a predetermined bore of said shut-off element.

* * * * *